United States Patent [19]

Sälzle

[11] Patent Number: 4,555,304

[45] Date of Patent: Nov. 26, 1985

[54] METHOD OF POLISHING GLASS ARTICLES IN AN ACID BATH

[76] Inventor: Erich Sälzle, Nadistrasse 8, D-8000 München 40, Fed. Rep. of Germany

[21] Appl. No.: 537,209

[22] Filed: Sep. 29, 1983

[30] Foreign Application Priority Data

Oct. 13, 1982 [DE] Fed. Rep. of Germany ....... 3238011
Jun. 24, 1983 [DE] Fed. Rep. of Germany ....... 3322875

[51] Int. Cl.$^4$ .............................................. C03C 15/02
[52] U.S. Cl. .................................. 156/663; 252/79.3; 252/79.4
[58] Field of Search ........................... 134/3; 156/663; 252/79.3, 79.4

[56] References Cited

U.S. PATENT DOCUMENTS

| | | | |
|---|---|---|---|
| 1,777,321 | 10/1930 | Meth | 156/663 |
| 2,328,533 | 8/1943 | Walker | 156/663 X |
| 3,290,193 | 12/1966 | Salzle | 156/663 X |
| 3,546,037 | 12/1970 | Salzle | 156/663 X |
| 4,040,897 | 8/1977 | Blish et al. | 156/663 X |
| 4,332,649 | 6/1982 | Sälzle | 156/663 X |
| 4,395,304 | 7/1983 | Kern et al. | 156/663 X |

FOREIGN PATENT DOCUMENTS 2949383 12/1980 Fed. Rep. of Germany .

Primary Examiner—Marc L. Caroff
Attorney, Agent, or Firm—Karl W. Flocks; Sheridan Neimark

[57] ABSTRACT

The method according to the invention of polishing glass in a polishing bath containing sulfuric acid and hydrofluoric acid permits long polishing times and thus reduced alternating treatments in polishing bath and washing bath at high polishing speed due to the fact that the polishing bath contains at least one acid which is stronger than the hydrofluoric acid, in particular acids whose dissociation constants are higher than that of the second dissociation stage of the sulfuric acid; preferably, oxalic acid is used. In order that the sulfuric acid concentration can be increased—in particular for glasses containing alkaline earth—0.1 to 5 g sodium chloride and/or potassium chloride per liter of polishing bath are added to the polishing bath during an 8-hour shift, either all at once or in portions.

16 Claims, No Drawings

METHOD OF POLISHING GLASS ARTICLES IN AN ACID BATH

It is known that glass articles—both pressed glass and ground glass articles may—be polished by chemical means, using a polishing bath containing hydrofluoric acid and sulfuric acid. Due to the reactions with the glass consituents of the surface of articles, as take place during the acid polishing, a firmly adherent layer of reaction products is formed thereon. These reaction products are generally sulfates, fluorides and silico-fluorides of the cations contained in the glasses. This layer of reaction products checks the polishing process, that is, the action of the polishing acids on the glass surface, until the reactions come completely to a standstill. Heretofore, it was hence always necessary that the layer formed by reaction products of the polishing process be removed from the glass surface in order to be able to continue polishing. To that end, the polishing was interrupted, the coating was washed off and these steps were repeated many times until the desired degree of polish was achieved. Earlier, water was used to wash off the polish deposit but this gave rise to great drawbacks because, owing to the alternate polishing and washing, large quantities of water were introduced into and diluted the polishing bath. On the other hand, washings are produced having an acidity entailing not only undue acid consumption but also grave problems due to these acidic washings having to be neutralised in an elaborate manner before they can be discharged into rivers.

It is known from German Patent Specification No. 29 49 383 that the dissolved sodium ions and/or potassium ions can be removed from the polishing acid continuously, batchwise or intermittently in order thus to prolong considerably the polishing which can be effected with a single immersion or, in other words, to limit the alternating treatment by polishing bath and washing bath to but a few times, or to achieve the desired finish in one single polishing and washing step. According to this prior art, such removal of sodium ions and/or potassium ions from the polishing bath occurs by addition of fluorosilicic acid which leads to a precipitation of the corresponding silico-fluorides and these are then removed from the polishing bath by, for example, filtration or centrifuge. In addition to the fluorosilicic acid, phosphoric acid and/or acetic acid and optionally malonic, oxalic or tartaric acid were introduced into the polishing bath to improve precipitation. Another possibility of removing the alkali ions from the polishing bath exists according to this prior art in electrolysis in a mercury cell or a cell with a cation semipermeable membrane, in which the alkali ions are extracted from the polishing bath. Finally, there is also the possibility of removing the alkali ions from the polishing bath with the aid of a cation exchanger.

According to the method of the older German laid open print No. 31 23 908, an extremely low concentration of hydrofluoric acid, i.e. < 1% HF, in particular 0.5 to 0.8% HF, is desired in the polishing bath apart from sulfuric acid in order to keep the dissociation degree of the hydrofluoric acid as high as possible. A polishing bath is known from the US patent specification No. 17 77 321, from the year 1930, having been prepared from hydrofluoric acid, sulfuric acid (30% concentration), water and a small amount of fuming sulfuric acid of unknown concentration and to which about 0.7 g/l $P_2O_5$ have been added as "controlling agent".

A polishing bath is known from the German Patent Specification No. 11 89 681 having a sulfuric acid concentration of between 55 and 67% and a hydrofluoric acid concentration of between 5 and 7% and which works at a temperature of between 55° and 70° C. and contains a heavy metal salt or strongly oxidising potassium permanganate or chromium oxide to influence the constitution of the salt deposit forming on the glass surface.

Apart from the number of necessary alternating treatments of the glass articles to be polished in the polishing bath and the washing bath, the consumption of hydrofluoric acid and sulfuric acid too is of particular importance for an economic method of polishing glass articles. The acid consumption, in particular the consumption of hydrofluoric acid, is dependent on the composition of the polishing bath and influences the polishing time of a batch of glass articles or the number of batches to be polished without the necessity of renewing or regenerating the polishing bath. Due to the density of salt precipitating on the glass surface upon high concentration, the polishing speed of a polishing bath essential to the polishing procedure is in inverse proportion to the concentration of sulfate ions and fluoride ions in the bath.

The object of the invention is a method of polishing glass articles in a polishing bath containing sulfuric acid and hydrofluoric acid and rinsing the finally polished articles with sulfuric acid and/or water with high polishing speed, i.e. relatively short polishing times while at the same time prolonging the working capability of the polishing bath. A further object of the invention is to improve this polishing bath such that it is capable of working without special cleansing measures or at least partial renewal during an 8-hour shift, while the efficiency of the polishing bath and the polishing quality meets all requirements.

Said first object is met according to the invention by adding to the polishing bath one or more acids which are not strongly oxidizing but are stronger than the hydrofluoric acid and optionally stronger than the second dissociation stage of the sulfuric acid, by which means the concentration of fluoride ions and optionally of sulfate ions in the polishing bath is kept low by inhibitated dissocation of the corresponding acids. In particular when rough-cut glass articles are being polished, it is essential that the concentration of fluoride ions be kept as low as possible. In order to bring glass articles of this type to the desired degree of polish in one single immersion, the concentration of fluoride ions must be kept particularly low so that the deposit forming during the polishing reaction results in such fine form and with such minor adhesive capacity on the surface of the glass articles, that it does not firmly adhere.

This addition of acids according to the invention, being stronger than the hydrofluoric acid and preferably also having a higher dissociation constant than the second stage of the sulfuric acid, should be strictly differentiated from the addition of fluorosilicic acid for the precipitation of sodium silicofluorides and /or potassium silicofluorides according to German Patent Specification No. 29 49 383. There, the aim is the removal of the alkali ions from the polishing bath by means of adding acid, whereas here the aim is the repression of the dissociation of the hydrofluoric acid and sulfuric acid contained in the polishing bath to such an extent that a high polishing speed, correspondingly short polishing times, or a minimum number of alternating treatments in the polishing bath and in the washing bath, become necessary due to the low $SO_4''$ concentration and, in particular, $F'$ concentration.

With the proviso that they meet the above requirement, i.e., are a stronger acid than hydrofluoric acid, the following are suitable for the object according to the invention: phosphoric acids, and organic acids including monocarboxylic acids such as acetic acid, dicarboxylic acids such as oxalic acid, malonic acid or phthalic acid, hydroxycarboxylic acids such as tartaric acid or citric acid. Fluorosilicic acid is not suitable in this case as its concentration cannot be adjusted under the prevailing process conditions due to continuous new formation in the bath and temperature-dependent evaporation (as $SiF_4$) from the bath. A strongly oxidizing acid such as chromic acid is not suitable due to its strong oxidizing effect.

Up until now, it was only possible to regulate the dissociation of hydrofluoric acid and thus the concentration of fluoride ions in the polishing bath via the concentration of sulfuric acid and the bath temperature. The disadvantage in this method is that the concentration of sulfate ions must be in a certain proportion to the concentration of fluoride ions if faultless polishing is to be the result. Therefore, when polishing diamond-ground soda glasses hitherto, it was necessary that as high a concentration of sulfuric acid as possible be worked with. so that the dissociation of hydrofluoric acid and thus the concentration of fluoride in the polishing bath is reduced so far that even these rough-cut glasses could be polished in a sustained program involving many bath alternating treatments.

The measure according to the invention, in which an acid stronger than hydrofluoric acid is added to the polishing bath, makes it possible for the first time, independently of the sulfuric acid concentration, to reduce the fluoride ion concentration to values such that the salts resulting during the polishing reaction have a composition, structure and adhesive capacity on the surface of the glass article such that the polishing procedure can be run without interruption over a long period and, in particular, the desired degree of polish is achieved by one single immersion of the glass articles into the bath according to the invention.

A further advantage in the method according to the invention is that, quite generally speaking, the polishing method becomes independent of the cation components of the glass (alkali, alkaline earth) due to the influence, independent of the sulfuric acid concentration, on the dissociation of the hydrofluoric acid and thus on the fluoride ion concentration in the polishing bath. If the glasses to be polished contain calcium, then oxalic acid is not added to the polishing bath in this case because calcium oxalate is insoluble and would precipitate. However, various other usable acids are available to the method according to the invention, as indicated above. In the same way, tartaric acid is to be avoided in the case of glasses containing potassium due to the possible formation of the hardly soluble potassium tartrate.

As indicated above, prerequisite for the applicability of acids in the method according to the invention is that they be stronger than, i.e., have a higher dissociation constant, than the hydrofluoric acid. Expediently, the acids should also have a dissociation constant which is at least between the first and second dissociation stage of the sulfuric acid, this being true of most of the acids listed above. However, oxalic acid has a dissociation constant higher still than that of the second stage of the sulfuric acid so that the sulfate ion concentration can also be lowered in the polishing bath by oxalic acid. Thus, in the method according to the invention, use of oxalic acid is preferred. If other acids are worked with, that is with acids whose dissociation constant is between the first and second stage of the sulfuric acid, the concentration of sulfate ions can only be influenced by the sulfuric acid concentration and temperature of the polishing bath. The higher the temperature of the polishing bath, the more dissociated the sulfuric acid. Too high bath temperatures are therefore to be avoided. This method can even be used at room temperature which, however, requires longer polishing times.

The quantity of acid to be added to the polishing bath containing sulfuric acid and hydrofluoric acid depends to a certain degree on the concentration of sulfuric acid and hydrofluoric acid respectively. An acid addition of 1 to 20 or 30 g/l is generally appropriate for a polishing bath containing 40 to 65 percent by weight $H_2SO_4$ and 1.5 to 12 percent by weight HF. In a polishing bath containing 45 to 60 percent by weight $H_2SO_4$ and 1.5 to 6 percent by weight HF, 1 to 11 g/l of the desired acid should be added.

In addition to the advantages already mentioned above, the method according to the invention also has the advantage that the consumption of hydrofluoric acid and the loss of silicon tetrafluoride to the exhaust air can be reduced in comparison to known methods with a considerable number of alternating treatments; the result is that detriment to the environment or the means involved in gas scrubbing of the exhaust air are not so great. Due to the shorter polishing time required and the adjustment to the most expedient fluoride ion concentration, the consumption of hydrofluoric acid and sulfuric acid is also reduced considerably in comparison to the known method. As the desired degree of polish can be achieved directly after removing a minimum amount of glass, the formation of sludge in the polishing bath is correspondingly low.

The above polishing baths according to the invention achieve a high polishing speed, that is relatively short polishing times, while at the same time prolonging the working capability of the polishing baths. The concentration of sulfuric acid in the polishing bath depends on the composition of the glass to be polished; this is particularly true of glasses which contain alkaline earth ions, in particular calcium. In the above polishing bath according to the invention, the sulfuric acid concentration amounts to 35% to 65% and, indeed, for glasses containing alkaline earth should be only 60% to 65%. If the sulfuric acid concentration is increased, polishing flaws will occur. This narrow range for sulfuric acid concentration in the polishing bath for alkaline earth glasses is disadvantageous for a large-scale process. Also, it cannot be maintained during a usual 8-hour shift without cleansing or partial renewal. During cooling of the polishing bath, the precipitation of alkaline earth ions can be insufficient so that the consumption of sulfuric acid can be relatively high.

The above-named second object of the invention, i.e., a polishing bath which is capable of working during an 8-hour shift without special cleansing measures, or at least partial renewal, while the efficiency of the polishing bath and the quality of polish meet all requirements, is met by adding 0.1 to 5 g sodium chloride and/or potassium chloride per liter to the above polishing bath according to the invention during an 8-hour shift, either all at once or in portions at intervals after a certain operating time during which the polishing effect of the bath is seen to sink. If sodium chloride and potassium chloride are used, the total amount to be added is generally rather less than when only one salt is added—in particular, about 10% less. Lowering of the effectiveness of the polishing bath reveals itself in a gradual lengthening of the total polishing time of a batch or in the necessity to carry out several alternating treatments in polishing bath and washing bath, or also when local polishing flaws appear after the polishing bath has been working for some time, these being, e.g., blue tarnishing of the surface of the glass articles.

If the total polishing time necessary for achieving the desired degree of polish for the batch in question has increased by a certain proportion, for example, by 25 to 50%, or if the first signs of polishing flaws, such as bluish discolouration or etching have shown themselves, sodium chloride and/or potassium chloride are added to the polishing bath in accordance with the invention which, in most cases, causes the polishing flaws on the batch just treated to disappear again immediately. It will also be seen that after a short time, which can amount to between about 10 and 20 minutes, the total polishing time necessary for the desired degree of polish of the batch in question has become reduced to normal again. The bath improved according to the invention then enables flawless polishing quality, economic operation and low acid consumption until the effectiveness of the polishing bath sinks once again and salt must once more be added. However, it is generally sufficient to add salt once, approximately in the middle of an 8-hour shift, in order to be able to work without additional cleansing measures or renewal of the bath during the entire shift. At the end of the shift, the polishing bath can be regenerated or renewed or it becomes optimally effective again after renewed addition of salt.

It is pointed out that the effect achieved by the addition of salt in accordance with the invention is not achieved if hydrochloric acid alone is added to the polishing bath.

The addition of salt to a polishing bath which, apart from sulfuric acid and hydrofluoric acid, also contains a strong, non-oxidising acid, had the surprising effect that the capacity of the polishing bath for holding calcium ions and also other divalent and trivalent ions such as zinc and boron in solution could be increased to an unusual degree. In the bath containing salt according to the invention, the number of alternating treatments between polishing bath and washing bath required in comparison to the prior art is further reduced. Moreover, it is also possible to polish glasses flawlessly without alternating treatment in a so-called single-bath process in which the glass articles can be immersed in the polishing bath only once for a slightly longer time and after direct achievement of the desired degree of polish can be rinsed.

However, it is not an urgent requirement of the polishing bath used according to the invention to regenerate the polishing bath by salting out at the end of a shift or daily as a redissolution of precipitated salts does not occur when the polishing bath is heated for the first batch.

A further considerable advantage—as already indicated above—is that the polishing bath containing salt according to the invention does not set narrow limits as far as the sulfuric acid concentration is concerned, but also allows operation with higher sulfuric acid concentration which is desirable for glasses containing CaO in particular in view of the total polishing time of a batch. The workable range of sulfuric acid concentration is between 35 and 75 percent by weight $H_2SO_4$ for the method containing salt—as against an upper limit of 65% without the addition of salt—while the polishing baths containing salt according to the invention permit a sulfuric acid concentration of between 60 and 75 percent by weight—as against 60 to 65 percent by weight, as mentioned—for glasses containing calcium oxide.

A further advantage of the polishing bath containing salt is that the temperature of the polishing bath during the polishing procedure can be kept unusually low. In general, it was hitherto necessary to maintain the temperature of the polishing bath at between about 50° C. and 65° C. Thus, according to the invention, it is not only possible to work with higher sulfuric acid concentrations—and the advantages connected therewith—without the danger of a "burning" of the surface of the glass articles, but also in addition at temperatures which are considerably below those which were previously usual or regarded as possible for acid polishing of glass articles. Thus, the method according to the invention can be carried out faultlessly at a bath temperature of 20° C. to 40° C.

A particularly expedient application of the method according to the invention is for screen tubes, television tubes and the like which have been ground with diamond grinding wheels and then sandblasted. By means of the method according to the invention, these glass parts achieve in the shortest immersion periods—such as about 20 s or 2×10 s—degree of polish which could not hitherto be achieved for articles of this kind.

The method according to the invention will be illustrated in detail by means of the following examples.

EXAMPLE 1

Glass articles of lead crystal—approximately 30% PbO, which had been corundum ground—were to be polished. The polishing bath was a solution having a density of 1.58 g/cm$^3$ at 20° C., containing 50 percent by weight $H_2SO_4$, 3 percent by weight HF and 3 g/l oxalic acid (oxalic acid concentration, 0.15 percent by weight), and was operated at a temperature of 50° C. The desired degree of polish was achieved without alternating treatment in a polishing time of 12 minutes.

EXAMPLE 2

Glasses of lead crystal—30% PbO, which had been diamond ground were to be polished. The polishing bath was a solution containing 45 percent by weight $H_2SO_4$ and 4 percent by weight HF as well as 7.5 g/l oxalic acid corresponding to an oxalic acid concentration of 0.35 percent by weight. The bath was operated at a temperature of 55° C. After four immersions in the polishing bath during 1.5 minutes and then transferal into a sulfuric acid washing bath, the desired degree of polish was achieved in a total polishing time of 10 minutes.

EXAMPLE 3

As modification of Example 2, a solution containing 55 percent by weight $H_2SO_4$, 6 percent by weight HF and 11 g/l oxalic acid, corresponding to an oxalic acid concentration of 0.7 percent by weight, was used. With this polishing bath, no alternating treatment was necessary and after a polishing time of 20 minutes, the desired degree of polish was achieved. The consumption of hydrofluoric acid was 30% higher than in Example 2.

EXAMPLE 4

Hand-blown glasses, containing 24% PbO were to be polished with a solution containing 45 percent by weight $H_2SO_4$, 2.5 percent by weight HF and 3 g/l tartaric acid, corresponding to a tartaric acid concentration of 0.3 percent by weight while the bath was maintained at a temperature of 50° C. After a polishing time of 20 minutes without alternating treatment, the desired degree of polish was achieved.

EXAMPLE 5

Pressed glassware with 24 percent by weight PbO was to be polished using a solution containing 60 percent by weight $H_2SO_4$ and 5 percent by weight HF as well as 1.1 percent by volume phosphoric acid $H_3PO_4$ (of 85 w %) with a temperature or 50° C. After a polishing time of 15 minutes without alternating treatment, the desired degree of polish was achieved.

EXAMPLE 6

Articles made of a glass containing 24% PbO and 4% CaO were polished in a polishing bath containing 70% sulfuric acid and 4.5% hydrofluoric acid as well as 2.5 g/l tartaric acid with a temperature of 50° C., the entire polishing process occurring in the form of four or five alternating treatments—depending on the type of grinding of the articles—involving immersion in the polishing bath and subsequent immersion in the sulfuric acid washing bath. The entire polishing time, i.e., the time during which the articles were in the polishing bath, was initially 12 minutes and in the course of an operating time lasting four hours, increased to 20 minutes.

0.3 g NaCl, based on 1 l of polishing bath, was then added to the polishing bath and after approximately 15 minutes, a new batch of glass articles could be polished within 15 minutes.

Towards the end of the 4-hour operating period and lengthening of the total polishing time of a batch to 20 minutes, a light blue tarnishing was to be seen on the glass articles which disappeared immediately after addition of the salt solution.

EXAMPLE 7

Corresponding to Example 6, articles of a glass containing 5% PbO and 5% CaO were polished in a polishing bath containing 75% sulfuric acid, 1.5% hydrofluoric acid and 10 cm³ phosphoric acid (of 75 w %) at 40° C. in four alternating treatments and a total polishing time of 15 minutes. Within an operating time of 4 hours, the polishing time increased to approximately 20 minutes. After the addition of 0.1 g/l NaCl and 0.1 g/l KCl, the polishing time for the subsequent batches was again 15 minutes. The local blue discolouration appearing towards the end of the 4-hour operating time was no longer apparent after the addition of salt.

EXAMPLE 8

Corresponding to the above examples, articles of a glass containing 28% PbO were polished within 3.5 minutes to the desired degree of polish in a polishing bath containing 65% sulfuric acid, 8% hydrofluoric acid and 6 g/l oxalic acid, at a temperature of 39° C. without alternating treatment, i.e., in a single bath process. After a bath operating time of approximately 4 hours, isolated patches of blue discolouration appeared on the glass articles and the polishing time gradually increased to 5 minutes. After addition of 0.5 g/l NaCl and a waiting time of 15 minutes, polishing flaws no longer appeared and the polishing time adjusted again to 3.5 minutes to a maximum of 4 minutes.

I claim:

1. A method of polishing glass articles comprising providing a polishing bath of acids consisting essentially of (1) 35-75% by weight of bath of sulfuric acid, (2) 1.5-12% by weight of bath of hydrofluoric acid, and (3) an amount of at least one non-oxidizing organic acid which is stronger than HF sufficient to hinder the dissociation of HF and thereby retard the formation of fluoride ions in the bath;

contacting glass articles to be polished with said polishing bath for a time sufficient to effect polishing of said glass, whereby deposits forming during polishing are in fine form with poor adhesive capacity on the glass surface;

avoiding the substantial presence in the bath of fluorosilicic acid which serves to remove alkali metal ions in the form of precipitates of alkali metal silico-fluorides; and repeatedly contacting glass articles with said bath over a normal working shift of about 8 hours and, upon decrease in the effectiveness of said polishing bath or the appearance of polishing flaws due to reduction of bath effectiveness, adding to the bath 0.1 to 5 g of sodium chloride and/or potassium chloride per liter of polishing bath without otherwise renewing or cleansing said bath over said shift.

2. The method according to claim 1, wherein, after a polishing bath operating time of approximately 4 hours, approximately half the amount of sodium chloride and/or potassium chloride are added.

3. The method according to claim 1 wherein the temperature during polishing is 20° C. to 40° C.

4. The method according to claim 1 of polishing glass articles containing alkaline earth, wherein these are polished in a polishing bath containing 60 to 75 percent by weight sulfuric acid.

5. The method according to claim 4, wherein the temperature during polishing is 20° C. to 40° C.

6. The method according to claim 1, wherein lead crystal glasses of approximately 24 to 30 percent by weight PbO are polished.

7. The method according to claim 1, wherein lead crystal glasses are polished.

8. The method according to claim 1, wherein lead crystal glasses containing CaO are polished.

9. A method according to claim 1, wherein said at least one non-oxidizing organic acid is also stronger than the second dissociation stage of said sulfuric acid.

10. A method according to claim 1, wherein said at least one non-oxidizing organic acid is a monocarboxylic acid, a dicarboxylic acid or hydroxy carboxylic acid.

11. A method according to claim 10, wherein said at least one non-oxidizing organic acid is oxalic acid, malonic acid, tartaric acid, citric acid or a mixture thereof.

12. A method according to claim 1, wherein said amount sufficient of non-oxidizing organic acid is in the range of 1 to 30 g of said non-oxidizing organic acid per liter of polishing bath.

13. A method according to claim 12, wherein said at least one non-oxidizing organic acid is oxalic acid, malonic acid, tartaric acid, citric acid or a mixture thereof.

14. A method according to claim 1, wherein said amount sufficient of said non-oxidizing organic acid is in the range of 1 to 20 g of said non-oxidizing organic acid per liter of said polishing bath.

15. A method according to claim 1, wherein said hydrofluoric acid is present in an amount of 1.5 to 6% by weight of bath, and said amount sufficient of said non-oxidizing organic acid lies in the range of 1 to 11 g of said non-oxidizing organic acid per liter of bath.

16. A method according to claim 15, wherein said non-oxidizing organic acid is oxalic acid.

* * * * *